US008836638B2

(12) United States Patent
Madhvanath

(10) Patent No.: US 8,836,638 B2
(45) Date of Patent: Sep. 16, 2014

(54) SILENT SPEECH BASED COMMAND TO A COMPUTING DEVICE

(75) Inventor: Sriganesh Madhvanath, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 947 days.

(21) Appl. No.: 12/954,688

(22) Filed: Nov. 26, 2010

(65) Prior Publication Data
US 2012/0075184 A1 Mar. 29, 2012

(30) Foreign Application Priority Data
Sep. 25, 2010 (IN) .............................. 2817/CHE/2010

(51) Int. Cl.
*G09G 5/00* (2006.01)
(52) U.S. Cl.
CPC ......... *G01L 15/24* (2013.01); *G06F 2203/0381* (2013.01); *G01L 15/22* (2013.01)
USPC .......................................... 345/156; 704/210
(58) Field of Classification Search
CPC . H04N 1/107; H04N 1/0036; H04N 1/00363; H04N 1/00374; H04N 1/2166; H04N 1/2187; H04N 21/2225; H04N 21/25891; H04N 21/26606; H04N 21/2668; H04N 21/4227; H04N 21/44222; H04N 21/47202
USPC .......................... 345/156, 169, 173, 174, 175
See application file for complete search history.

(56) References Cited

U.S. PATENT DOCUMENTS

| 5,802,220 | A | * | 9/1998 | Black et al. ................. 382/276 |
| 6,009,210 | A | * | 12/1999 | Kang ............................ 382/276 |
| 6,677,969 | B1 | | 1/2004 | Hongo |
| 2002/0033797 | A1 | * | 3/2002 | Masthoff et al. ............. 345/156 |
| 2003/0046254 | A1 | | 3/2003 | Ryu et al. |
| 2009/0153366 | A1 | * | 6/2009 | Im et al. ......................... 341/20 |
| 2009/0245572 | A1 | | 10/2009 | Tsao |

FOREIGN PATENT DOCUMENTS

JP 2008310382 12/2008

OTHER PUBLICATIONS

"Lip reading mobile promises end to noisy phone calls", BBC News, Mar 5, 2010, http://news.bbc.co.uk/2/hi/technology/8549454.stm.
Christopher A. Robbins, "Speech and Gesture Based Multimodal Interface Design", pp. 2-29, Apr. 2004.
Gingichashvili, Sarah, "Criminals Beware: Computerized Lip Reading", The Future of Things, Science and Technology of Tomorrow, Jan. 16, 2008.
Minh Tue Vo, Alex Waibel, "Multimodal Human-Computer Interaction", Entire Document, Proceedings of ISSD'93, Waseda, 1993.
Piotr Dalka; Andrzej Czyzewski, "Lip movement and gesture recognition for a multimodal human-computer interface" Proceedings of the International Multiconference on Computer Science and Information Technology, vol. 4, pp. 451-455, 2009.

* cited by examiner

*Primary Examiner* — Duc Dinh

(57) ABSTRACT

Presented is a method for executing a command on a computing device. A computing device receives a first command and a second command, wherein the second command is, optionally, silent speech. The first command and the second command are combined to provide a final command to the computing device for execution.

18 Claims, 3 Drawing Sheets

SILENT SPEECH BASED COMMAND TO A COMPUTING DEVICE

RELATED APPLICATION

Benefit is claimed under 35 U.S.C. 119(a)-(d) to Foreign application Serial No. 2817/CHE/2010, filed in INDIA entitled "SILENT SPEECH BASED COMMAND TO A COMPUTING DEVICE" by Hewlett-Packard Development Company, L.P., filed on Sep. 25, 2010, which is herein incorporated in its entirety by reference for all purposes.

BACKGROUND

Machine human interaction has been a subject of continuous interest for researchers. Especially in the context of a computing device, manufacturers are competing with each other to introduce novel ways of human machine engagement for their customers. Gone are the days when a user had to remember programming language like commands to interact with a computer system. Graphic user interfaces (GUIs) and development of peripheral devices, such as, a mouse or a joystick, has changed the way a user interacts with a machine. In fact, modern day computer interaction has gone a few steps further ahead. Touch and gesture interfaces are the new paradigms of machine human interaction that adorns latest computing devices, including mobile systems.

Considering the variety of interactive options available, multimodal interaction is fast becoming a new norm for engagement with a machine. A user may employ a combination of interactive modes, such as, a touch interface and a keyboard, to communicate with a device. Speech may also be used along with other modes, such as, a mouse or a touchpad to provide a command. However, there may be situations where a speech interface may not be appropriate. For example, if a user is working in a noise free area, such as, a library or a hospital, it may not be desirable to employ a speech interface to interact with a computing device.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned above, multimodal interaction is increasingly becoming popular amongst users as a new mechanism of engagement with a computing device. Apart from touch and gestures, speech may also be used to communicate a command to a machine. However, there may be situations, as mentioned earlier, where a user may be uncomfortable speaking to a system, or when speech may be difficult to interpret, for example, in an environment with a lot of noise, such as, during travel or in traffic.

Embodiments of the present solution provide a method and system for executing a command on a computing device. More specifically, the embodiments propose using silent speech (lip movement) in a multimodal command scenario, where silent speech may act as one of the commands to a computer system. In an embodiment, silent speech (lip movement) may act as a qualifier to another command.

For the sake of clarity, it may be mentioned that the term "silent speech" means speech communication without involving the use of sound. It may involve reading of the lip movements. Also, the words "command" and "input" are used interchangeably through out the document.

Figure 1:
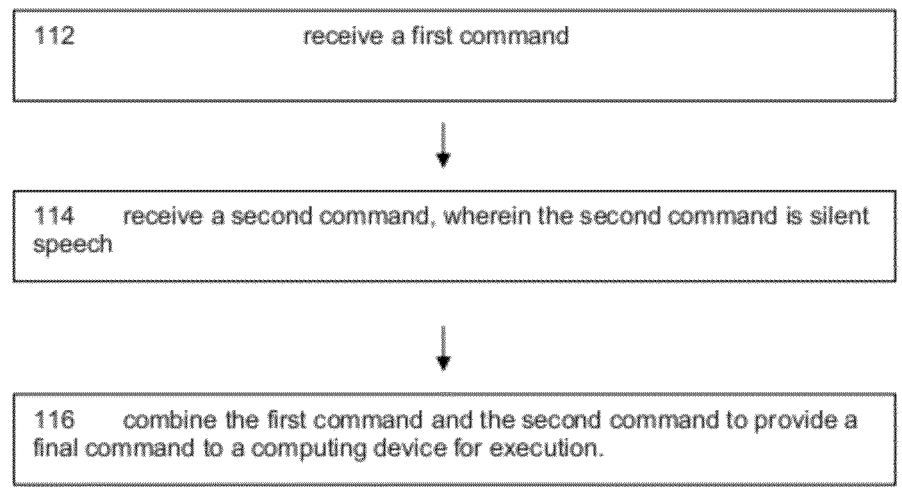
FIG. 1 shows a flow chart of a method of executing a command on a computing device according to an embodiment.

FIG. 1 shows a flow chart of a method of executing a command on a computing device according to an embodiment.

Step 112 involves receiving of a first command by a computing device. In an embodiment, a user provides a first command (an input) to his or her computing device. The first command may be provided (and received by a computing device) through a number of user interfaces. For example, a peripheral device, such as, a mouse, a keyboard or a joy stick may be used to receive an initial command. In another example, a machine integrated interface, such as, a touch screen or a trackball, may be used to receive a first command. In a yet another example, a gesture or a speech command may be received by the computing device.

To provide an illustration, a user may use a gesture command to zoom a portion of a text that a user may be reading on his or her computing device. For example, a combination of a user's thumb and index finger may serve to provide a gesture command to a computing device. The gesture command may allow a user to zoom-in a portion of a text or a photograph on the user's device by expanding his thumb and index finger from an initial closed position. A contraction of the same combination of thumb and index finger (to a closed position) may allow a user to zoom-out of a portion of a text or photograph. The computing device may use a gesture recognition application to recognize these gesture commands.

To provide another illustration, a computing device may receive a first command through a touch screen interface. To elaborate with the help of above "zoom" example, a touch screen interface on a computing device may provide a user an option to zoom-in or zoom-out of a portion of a text or a photograph. For example, the interface may provide a magnifying lens icon with a "+" symbol to indicate a zoom-in functionality. Additionally, the magnifying lens icon with a "−" symbol may be used to indicate a zoom-out functionality. A user is simply required to touch the desired magnifying lens icon to provide his or her input to the computing device.

In an embodiment, a first command may constitute a part of a multimodal command, which is a combination of several user inputs, used to activate a particular function on a computing device. A multimodal command may involve user inputs through multiple modes, such as touch, gesture, gaze, etc.

Step 114 involves receiving of a second command by the computing device of step 112. In an embodiment, the second command may optionally be in the form of "silent speech". As mentioned earlier, "silent speech" means speech communication without involving the use of sound. For example, mere lip movement without a sound component may be construed as silent speech. A user may provide a command to a computing device by simply mouthing the command language without actually speaking the words. In an embodiment, a second command may also (like first command) be a part of a multimodal command.

A camera configured to a computing device may be used to detect a user's silent speech command. The camera may be integrated with the computing device or removably attachable through wired or wireless means.

Further, a lip reading computer application may be present on the computing device to recognize "silent speech" or commands mouthed by a user. The lip reading computer application may use a speech vocabulary to recognize actual command word(s) or at least a close matching word(s). In an embodiment, the command word(s) or matching word(s) may be displayed on the computing device for further confirmation or selection by a user.

In another embodiment, the second command may be a speech command i.e. a user may actually pronounce one or more command words. For example, if a user wants to "zoom-in" a portion of a text, which he or she might be reading on a computing device, the user may speak out a speech command "zoom-in". In this case, an automatic speech recognition (ASR) application may be used by the computing device to recognize the speech component.

Figure 2:
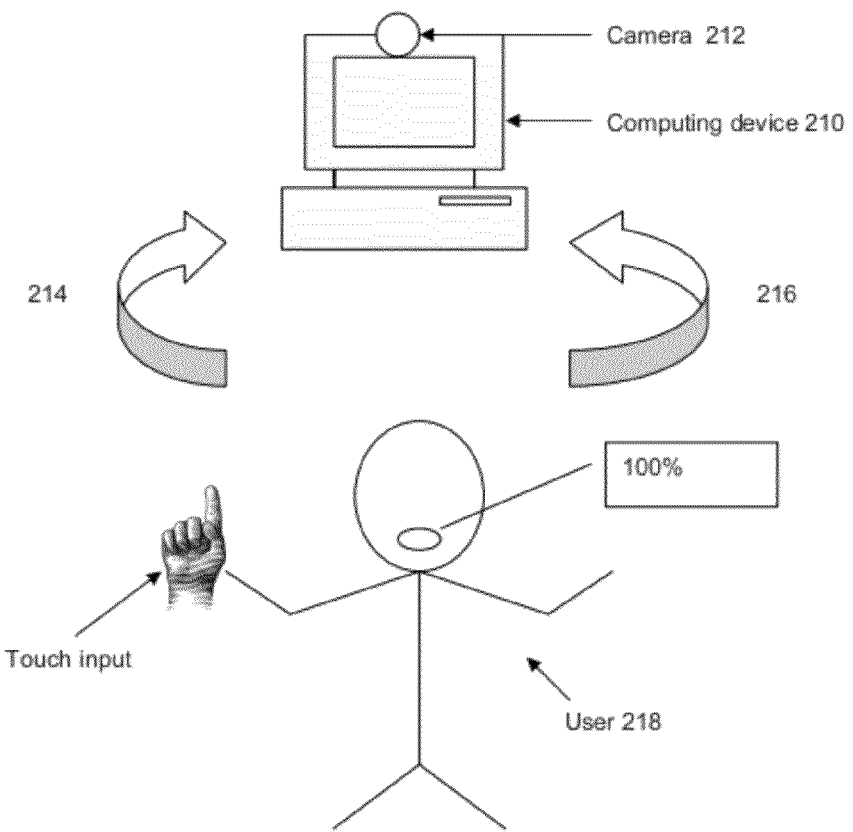
FIG. 2 shows a representative environment depicting a computing system operating according to an embodiment.

Step 116 involves combining the first command and the second command to provide a final command to the computing device for execution. Once the computing device recognizes the first command and the second command, a computer application on the computing device combines both commands to provide a final command to the computing device for execution. To provide an illustration using the "zoom" example mentioned earlier, a first command received by a computing device may be to "zoom-in" a portion of a text. A user may provide the first command through a touch interface on the computing device. A second command may be to zoom-in the text by "100%". Once both commands are recognized, the method step would combine them together and "zoom-in" the text on a user's device by 100%. In another embodiment, the second command ("100%") may be silent speech which is simply mouthed by a user to a computing device having a camera-based lip reading computer application. This is illustrated in FIG. 2.

In another embodiment, if a first command and a second command form a multimodal command, the method recognizes the intended multimodal command according to a pre-installed multimodal command dictionary on the computing device. Once the first command is identified, the second command may be used to qualify the first command. The final command is executed based on the recognition and combination of the first command and the second command. To provide an illustration, a multimodal command may include two individual commands. A first command could be to "zoom-in" a portion of a text. A user may provide the first command through a variety of interface options, such as, a touch interface, by gesture, by handwriting or a mouse input. A second command could be provided (and received by a computing device) through silent speech, wherein the user may qualify the first command by mouthing the qualifier. For example, if a user wants to zoom-in a text by "100%", he or she may mouth the second command ("100%"). Therefore, once the first command ("zoom-in"), let's say, through a gesture, is recognized by the computing device, for example, through a gesture recognition application, a "silent speech" vocabulary qualifying or corresponding to the recognized gesture may be identified from a pre-installed multimodal command dictionary.

In another related embodiment, the second command may be a speech command or a silent speech command. In this case, a user may either enunciate a command or just mouth it (silently). To provide an example, a first command may be provided, just like in the above example, through a gesture. Since there could be situations where a user may wish to switch between providing a second command through speech and silent speech, a second command could be received as a speech command or a silent speech command depending upon certain factors. Some of these factors may include the ambient conditions under which a computing device is operating (for example, the noise level in an environment), or these could be user defined parameters (for example, depending upon a time of the day, location) etc. In either case, the method recognizes both speech and silent commands and allows a user to switch between the two effortlessly. The method can separately process both silent speech (lip movement) and speech input, and merge recognition results from the two. It can also vary the weightage given to each type of input based on the factors mentioned.

To provide a first illustration, let's assume a user is visiting a hospital location (designated as a noise free zone). In such case, based on an analysis of the ambient noise by the user's computing device (say, with the help of a sensor), the proposed method may offer a user to provide his or her second command through silent speech. The method may also, optionally, obtain a specific user input in this regard. Or, in the alternative, the method may switch to a silent speech mode automatically and begin recognizing silent speech commands. A switch between a silent speech mode and a voice based speech mode takes place seamlessly. Therefore, the recognition of two commands may be simultaneous or separate. Once a user leaves the hospital premises, the method would offer or automatically begin to recognize voice based speech commands.

The embodiments may either explicitly switch between interpreting one modality or the other as described above, or do this implicitly by always interpreting both inputs and varying the weights associated with the two modes. To illustrate, let's assume a user is in a noisy environment. Again based on an analysis of the ambient noise, the proposed method may decide to reduce the weightage given to speech recognition results, and increase the weight given to interpretation of silent speech, transparent to the user. The user now has the option of speaking or using silent speech based on his or her preference and judgment. The method can support such individualistic user behavior by interpreting the user input received—only the lip movements, or both lip movements and speech input—to come up with the most likely interpretation. In the specific case when the user decides to speak aloud, the method interprets both lip movements and speech input and computes the weighted combination, such that the weight given to the interpreted speech is lower and that given to silent speech (lip movement) is higher.

In a third illustration, a user may like to control as to when a computing device may receive a second command through speech or silent speech. In this case, a user may define a time of the day when he or she would prefer to provide either a speech command or a silent command. For example, a user may prefer to provide a speech command during morning and evening (presumably, since a user is likely to be relatively more active), and a silent command during afternoon and night (presumably, since a user might not want to disturb another person enjoying a siesta or having a nap.) The user may define such parameters in his or her computing device and the method would switch between receiving the two commands (silent speech and speech) accordingly.

In the above embodiments, an automatic speech recognition (ASR) application may be used by the computing device to recognize the speech component. The silent command (or non-speech component of a speech command) may be interpreted by a lip reading computer application. Also, the recognition of a second command may be based on the recognition of the first command. A multimodal command dictionary may contain all possible combinations of a first command (such as gestures) and a second command (such as speech).

The dictionary may be customizable by a user, who may be free to add, modify or delete multimodal commands of his or her choice. Once the gesture command is identified, the corresponding speech vocabulary may be reduced to a limited set of terms that could combine with the recognized gesture according to the multimodal command dictionary. Subsequently, a ranking scheme may be used to find the second command corresponding to the first command and, thus, the combined final multimodal command. The final multimodal command would be executed by the computing device.

In another embodiment, a second command (through silent speech) may be received either prior to or later to a first command. Therefore, any particular sequence of receiving a first command or a second command by a computing device is not necessary.

Also, although the embodiments have been illustrated with a computing device receiving only two different commands (a first command and a second command), any number of commands (say, a third command, a fourth command, etc.), may be employed by the disclosed embodiments, with at least one command constituting a silent speech.

The method steps described above may not necessarily be performed in the sequence as outlined above. The steps may be performed in any other sequence as well, with a step(s) being performed prior or later to other method steps.

FIG. 2 illustrates a representative environment depicting a computing system operating according to an embodiment.

The representative environment includes a computing system or computing device 210. Computing device 210 may be any kind of electronic device, such as, but not limited to, a personal computer, a desktop computer, a laptop computer, a notebook computer, a network computer, a personal digital assistant (PDA), a mobile device, a hand-held device, or any other suitable computing device. The computing device may be a standalone system or a network system connected to other computing devices through wired or wireless means. In the representative environment, the computing device may a user's device i.e. it may be employed by a user to provide at least one command.

Computing device 210 includes input device, touch screen, to receive a command from a user. In other embodiments, the computing device may include an integrated camera 212.

In another embodiment, a camera may be removably attachable to the computing device. Camera 214 is used to detect a command from a user, such as, but not limited to, in the form of silent speech, wherein a user may just mouth the command word(s) without actually speaking them. A computer application present on the computing device may be used to recognize a command provided as silent speech.

In the representative environment, a first command 214 received by a computing device 210 may be to "zoom-in" a portion of a text. A user 218 may provide the first command through a touch interface on the computing device 210. A second command ("100%") 216 may be silent speech which is simply mouthed by a user to the computing device 210 having a camera (212) and a lip reading computer application. Once both commands are recognized, a computer application combines them together and "zoom-in" the text on the computing device 210 by 100%. The computer application(s) mentioned herein (and in this document) may be software components or programs having machine readable instructions readable by a processor.

Figure 3:
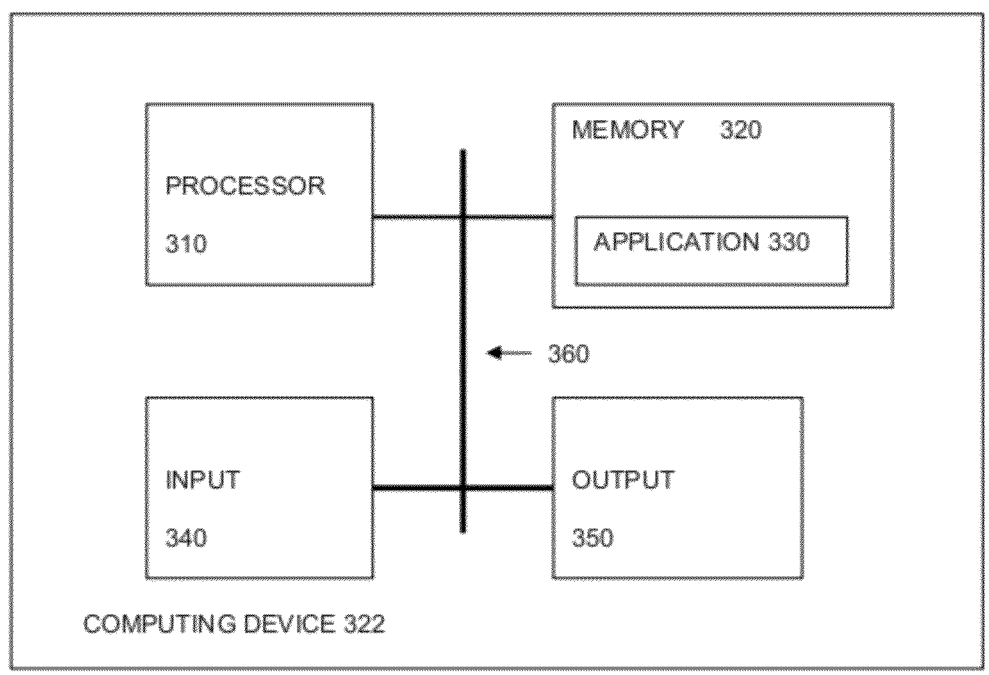
FIG. 3 shows a block diagram of a computer system according to an embodiment.

FIG. 3 illustrates a block diagram of a computing device 322 according to an embodiment.

The device 322 may include a processor 310, for executing computer executable instructions, a memory 320, an input device 340 and an output device 330. These components may be coupled together through a system bus 360.

The processor 310 is configured to execute machine readable instructions to processor a first command and a second command to provide a final command to the computing device for execution.

The memory 320 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 320 may be used to cache one or more computer applications (machine readable instructions) 330. For example, a computer application may be used to recognize a command provided as such silent speech. Same or another computer application may be used to combine a first command and a second command received by the computing device. The two commands may be combined to provide a final command to the computing device for execution.

The input device 340 may include a camera, a mouse, a key pad, a touch pad or screen, a track ball, a joy stick, a voice recognizer, and the like. The input device may be configured to receive at least one command (for example, a first command) provided by a user. The output device or a display system 350 may include a Virtual Display Unit (VDU), a printer, a scanner, and the like. The display system may be used to display the output of a final command executed by the computing device.

It would be appreciated that the system components depicted in FIGS. 2 and 3 are for the purpose of illustration only and the actual components may vary depending on the computing system and architecture deployed for implementation of the present solution. The various components described above may be hosted on a single computing system (or device) or multiple computer systems (or devices) connected together through suitable means.

The embodiments described provide significant benefits over the art. They require minimal or no training to use. They are relatively unobtrusive and suitable when speaking aloud is not desirable or appropriate. Further, apart from a camera, no addition sensor may be needed.

It will be appreciated that the embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A method for executing a command on a computing device, comprising:
   receiving a first command;
   receiving a second command in an interactive mode different from the first command;
   searching a stored command dictionary at least according to the first received command, wherein the command dictionary includes combinations of commands that form multimodal commands;
   identifying multimodal commands from the searching of the dictionary that include the first command in the combinations of commands that form the identified multimodal commands;
   combining the first command and the second command to create at least one of the identified multimodal commands; and
   providing the at least one of the identified multimodal commands to the computing device for execution.

2. A method according to claim 1, wherein the second command qualifies the first command.

3. A method according to claim 1, wherein the second command is a speech or silent speech command.

4. A method according to claim 3, comprising:
   recognizing the second command if the second command is in at least one of the identifying multimodal commands.

5. A method according to claim 1, wherein a user input is obtained prior to recognition of the first command or the second command.

6. A method according to claim 1, wherein the first command is a speech command, a gesture command or a touch input.

7. A method according to claim 1, wherein the first command is received through an input device, wherein the input device includes at least one of a touch screen, mouse, a keyboard, a trackball and a joystick.

8. A method according to claim 1, wherein the second command is received either prior to or later to the first command.

9. A computing device, comprising:
   an input device configured to receive a first command;
   a camera to receive a second command, wherein the second command is provided as silent speech; and
   a processor to execute machine readable instructions to
      search a command dictionary at least according to the first received command, wherein the command dictionary includes combinations of commands that form multimodal commands;
      identify multimodal commands from the searching of the dictionary that include the first command in the combinations of commands that form the identified multimodal commands; and
      combine the first command and the second command to create at least one of the identified multimodal command.

10. A computing device according to claim 9, wherein the input device includes at least one of a camera, a touch screen, a mouse, a keyboard, a trackball and a joystick.

11. A computing device according 9, wherein the camera to receive a second command is removably attachable to the computing device.

12. A computing device according to claim 9, wherein the computing device is a mobile device.

13. A computer program product comprising machine readable instructions stored on a non-transitory computer readable medium and are executable by a computer to:
   receive a first command;
   receive a second command, wherein the second command is provided as silent speech;
   search a command dictionary at least according to the first received command, wherein the command dictionary includes combinations of commands that form multimodal commands;
   identify multimodal commands from the searching of the dictionary that include the first command in the combinations of commands that form the identified multimodal commands; and
   combine the first command and the second command to create at least one of the identified multimodal commands.

14. A computer program product according to claim 13, wherein the second command is received either prior to or later to the first command.

15. A computer program product according to claim 13, wherein the second command qualifies the first command.

16. A method according to claim 1, comprising:
   determining a first modality of the first command;
   determining a second modality of the second command;
   determining factors, wherein at least one of the factors is associated with a current environmental condition in which the first or second command is received;
   assigning weights to the first and second commands based on the determined factors; and
   determining the at least one of the identified multimodal commands based on the weights.

17. A computing device according to claim 9, wherein the processor is to execute the machine readable instructions to:
   determine a first modality of the first command;
   determine a second modality of the second command;
   determine factors, wherein at least one of the factors is associated with a current environmental condition in which the first or second command is received;
   assign weights to the first and second commands based on the determined factors; and
   determine the at least one of the identified multimodal commands based on the weights.

18. A computer program product according to claim 13, wherein the machine readable instructions are executable to:
   determine a first modality of the first command;
   determine a second modality of the second command;
   determine factors, wherein at least one of the factors is associated with a current environmental condition in which the first or second command is received;
   assign weights to the first and second commands based on the determined factors; and
   determine the at least one of the identified multimodal commands based on the weights.

* * * * *

UNITED STATES PATENT AND TRADEMARK OFFICE
CERTIFICATE OF CORRECTION

| | | |
|---|---|---|
| PATENT NO. | : 8,836,638 B2 | Page 1 of 1 |
| APPLICATION NO. | : 12/954688 | |
| DATED | : September 16, 2014 | |
| INVENTOR(S) | : Sriganesh Madhvanath | |

It is certified that error appears in the above-identified patent and that said Letters Patent is hereby corrected as shown below:

In the Claims

In column 7, lines 58-59, in Claim 9, delete "command." and insert -- commands. --, therefor.

In column 8, line 1, in Claim 11, delete "according" and insert -- according to claim --, therefor.

Signed and Sealed this
Third Day of February, 2015

Michelle K. Lee
*Deputy Director of the United States Patent and Trademark Office*